United States Patent [19]
Burr

[11] 3,787,134
[45] Jan. 22, 1974

[54] PIN FOR INTERCONNECTING TWO PARTS OF A KNOCKDOWN ASSEMBLY

[75] Inventor: Alan Carleton Burr, East Norwalk, Conn.

[73] Assignee: Howe Folding Furniture, Incorporated, New York, N.Y.

[22] Filed: Feb. 28, 1972

[21] Appl. No.: 230,003

[52] U.S. Cl.... 403/408, 85/88, 52/758 H, 403/230 H
[51] Int. Cl............................................. F16b 13/00
[58] Field of Search. 287/56, 54 C, 189.36 H, 54 A, 287/54 B, 20.92 D; 211/177, 182; 85/7, 8.8; 46/28, 29, 20, 30; 312/263; 108/111, 153; 52/585, 280, 665, 666, 668

[56] References Cited
UNITED STATES PATENTS

| 1,844,463 | 2/1932 | Dodd | 85/8.8 |
|---|---|---|---|
| 3,595,123 | 7/1971 | Wurzel | 85/8.8 |
| 3,638,814 | 2/1972 | Lowery | 211/177 |
| 2,844,910 | 7/1958 | Korchak | 46/30 |

FOREIGN PATENTS OR APPLICATIONS

| 596,273 | 4/1960 | Canada | 46/20 |
|---|---|---|---|
| 379,078 | 8/1964 | Switzerland | 211/177 |

Primary Examiner—Jordan Franklin
Assistant Examiner—Conrad L. Berman
Attorney, Agent, or Firm—John W. Hoag

[57] ABSTRACT

A pin which has one circumferential groove adjacent one end and has two axially spaced circumferential grooves adjacent its other end, is long enough to be inserted through a member of a knock down assembly, with its grooved ends extending beyond opposite faces of the member respectively, in position for either or both ends to be inserted through a slot in an opposed end of another member of the assembly and to receive in a groove the edge of a slot defining portion of an opposed other member of the assembly. At a predetermined position between its ends the pin is reduced in diameter for a predetermined distance and shaped so that two of the pins may be inserted through the said member in crossed relation and disposed in the same plane.

2 Claims, 8 Drawing Figures

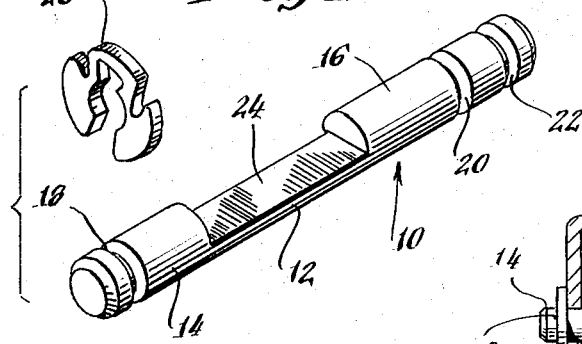
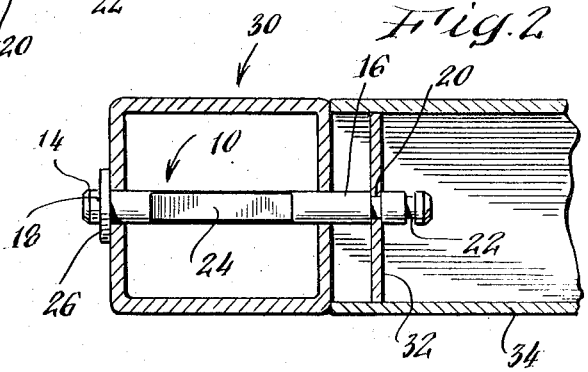
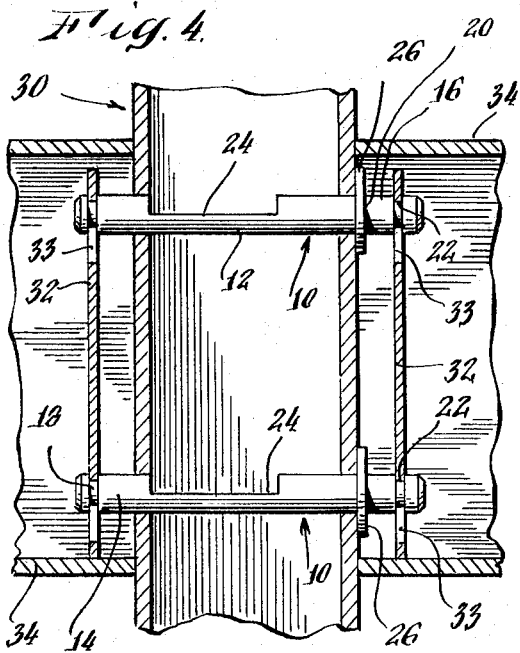
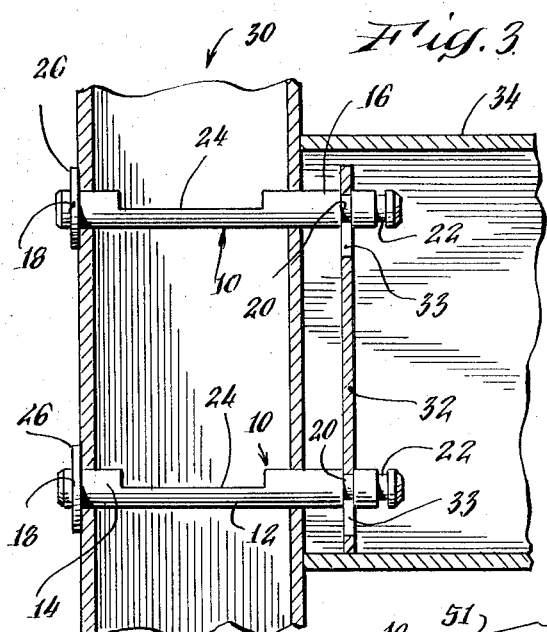
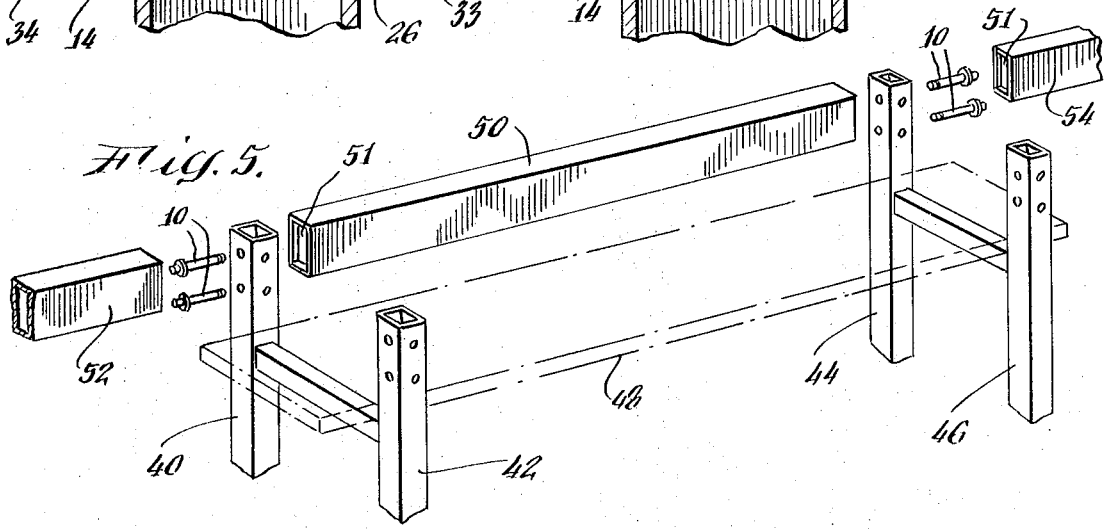

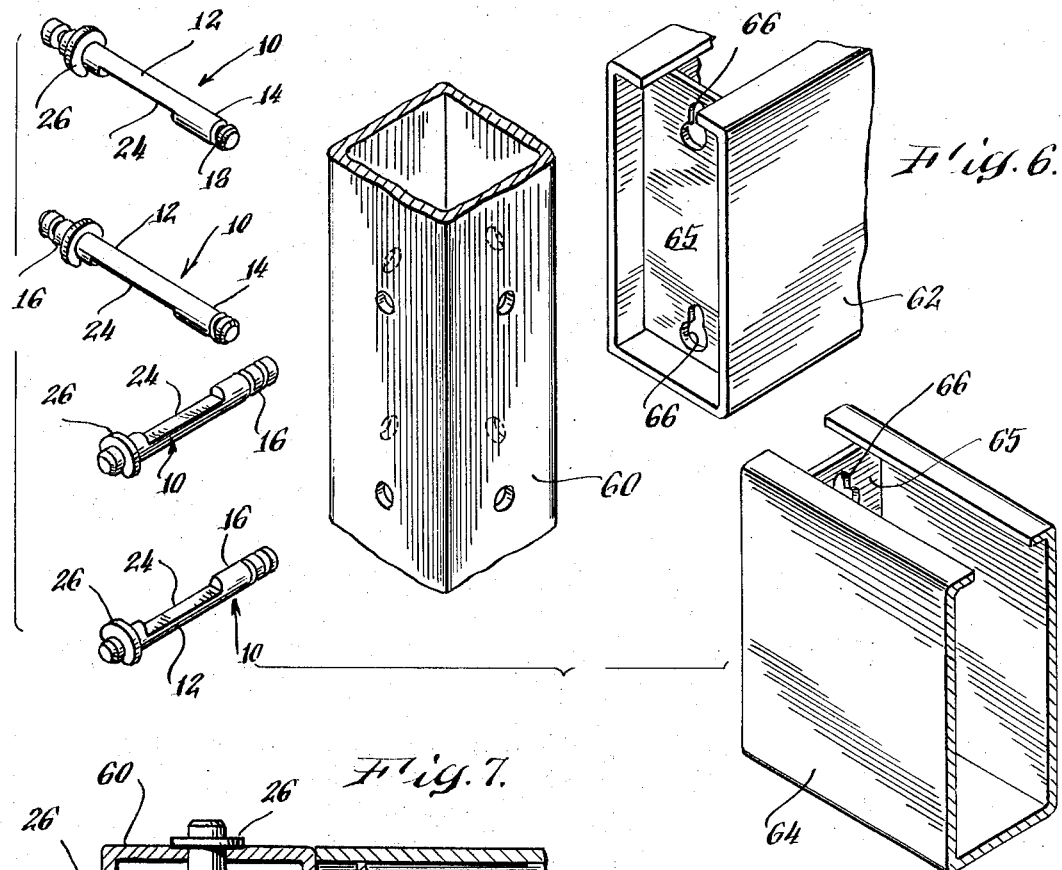
Fig. 6.
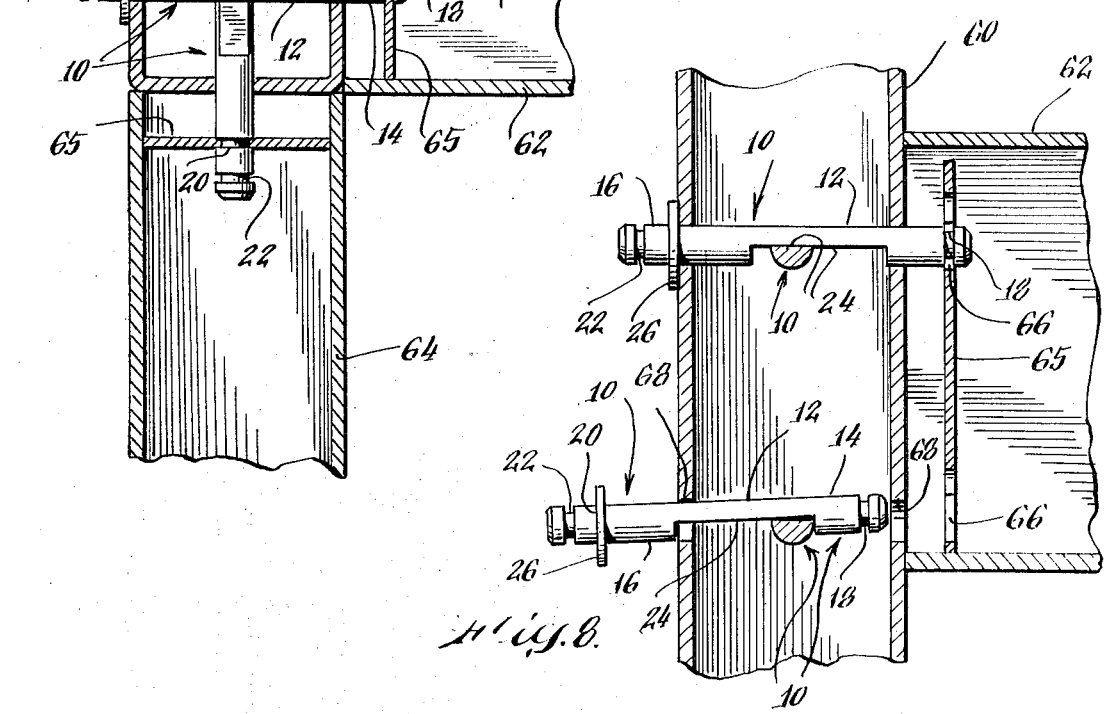
Fig. 7.
Fig. 8.

3,787,134

PIN FOR INTERCONNECTING TWO PARTS OF A KNOCKDOWN ASSEMBLY

FIELD OF THE INVENTION

This invention relates to means for interconnecting parts of a knock down structure and more particularly to an interconnecting pin adapted when inserted through one member of an assembly to provide means for attachment with a member or members disposed in alignment with the ends of the pin. The pin is also formed so that two of the pins may be crossed and placed in overlapping position extending through the support member in the same plane, the crossed pins providing means for attaching two, three or four other members of the assembly to the pin supporting member.

At the present time, a very practical problem connected with the use of knock down assemblies, such for example as the parts comprising a series of sectional bookcases or a series or cluster of study carrels, is the time and effort required for interconnecting the parts where the sectional bookcases or carrels and the like are to be used. The interconnecting pin which is the subject of this invention defines circumferential grooves adjacent its ends which when the pin has been inserted through one member of an assembly are disposed on opposite sides of the said member and are adapted to receive and engage with an edge defining portion of one or two other members of the assembly thus providing means whereby one or two other members of the assembly may be interconnected with and supported by the member through which the pin extends. Furthermore the pins are so formed that two pins may be inserted through the support member disposed at right angles in crossed relation but in the same plane thereby providing for connection with the support member of up to four other members of the assembly.

The invention will be best understood by reading the following description in connection with the drawings in which FIG. 1 is a perspective view of an assembly comprising the interconnecting pin which is the subject of this invention and a retainer ring which may be seated in any of three positions along the pin, FIG. 2 is a plan view looking down on a horizontal section through an upright support member and one end of a stretcher interconnected to the upright by the pin shown in FIG. 1, with a slot defining edge portion of an end plate of the stretcher engaged in the inner of a pair of peripheral grooves provided at one end of a pin, and with a retainer ring inserted in a single groove provided at the other end of the pin and disposed in abutting relation to the face of the upright which is its outer face in relation to the single stretcher supported from the upright by the interconnecting pin, FIG. 3 is a side elevation of a vertical section through the upright and one end of the stretcher showing how the stretcher is provided adjacent its end with an internal vertically disposed plate apertured to receive a pair of pins disposed through the upright as shown in FIG. 2, FIG. 4 is a view similar to FIG. 3 but showing the pins employed to support a plurality of stretchers extending from opposite faces of the upright, and illustrating the different distance the pins are inserted through the upright, and the different position of the retaining ring, to permit the single groove at one end of the pin and the outer groove of the pair of grooves at the other end of the pin to be engaged respectively by the edges of the face plates which define the openings in the end plates of the opposed ends of the stretchers respectively, FIG. 5 is an exploded view showing how different sections of a knock down bookcase may be interconnected by means of the interconnecting pin assemblies, FIG. 6 is another exploded view showing a tubular assembly member provided with opposed sets of pin receiving holes disposed at the same level, and pairs of interconnecting pins for insertion through said holes respectively, to engage and support a pair of stretchers from angularly related faces of the upright, FIG. 7 is a plan view looking down on a horizontal section taken through an upright and a pair of stretchers supported by the pins from different faces of the upright showing the pins crossed and disposed at the same level, and FIG. 8 is a side elevation taken on the lines 8—8 of FIG. 7 and showing how one interconnecting pin is inserted through the upright to cross over and extend at right angles to a similar pin previously inserted through the upright, with both pins disposed in the same plane.

DESCRIPTION

The pin 10 shown in the illustrated preferred embodiment of the invention is round except for an intermediate portion 12 which is half round. The portion 12 is not evenly spaced from the ends of the pin but is disposed nearer one end than the other thus making one end portion shorter than the other for a reason which will be explained. The intermediate portion 12 separates a short end portion 14 from a longer end portion 16. The end portions are of the same diameter. A single circumferential groove 18 is provided in the short end 14 and two circumferential grooves 20 and 22 are provided in the longer end portion of the pin. The rounded surface of the half round portion 12 of the pin is aligned with the surface of the end portions 14 and 16 respectively, and the flat face 24 of the half round portion is aligned with the axis of the end portions 14 and 16. If two pins 10 are placed in crossed position with their flat faces 24 in face to face relation, the pins will lie in the same plane and they may be thus used to support a plurality of assembly parts at the same level.

A retainer ring 26 is provided which is of larger diameter than the outside diameter of the end portions 14 and 16 of the pin. The retainer ring is a split ring, which may be of known kind, and is adapted to be selectively inserted in one of the grooves 18, 20 and 22 and may be moved from one of these grooves to another depending upon the use of the interconnecting pin. Retainer ring 26 is used to abut against an outer face of a member of the assembly through which its associated pin is inserted, to help position the pin extending through the supporting part of the desired distance and to prevent undesired axial movement of the pin through the supporting part.

In FIG. 2 a pin 10 is shown extending through a support member 30 and it will be noted that the retainer ring 26 is seated in the groove 18 in the smaller end portion 14 of the pin, and that the longer portion 16 of the pin extends through an aperture, which may desirably be a key slot 33 of the kind illustrated in FIG. 6, provided in the cross plate 32 of a part 34. It will be noted that the cross plate 32 is spaced from the end of part 34, which may be a cross member or stretcher for interconnecting and spacing apart two upright support members 30, and having cross plates 32 adjacent each its ends, and that, when the edge defining the opening in the cross plate through which the end of pin 10 extends is seated in the groove 20 of the pin, the end of a member 34 will be in abutting relation to a face of support member 30. This disposition of the pin within the member 30 is desirable when the pin is employed to support only one other member of an assembly so that the end, 14, will project outwardly a minimum distance and will be out of the way.

In FIG. 3 two pins 10 are shown inserted through the support member 30 and disposed in the same manner as shown in FIG. 2 with the respective grooves 20 in the pins engaged with the edges of the slot defining portions of the cross plate 32.

In FIG. 4 the pins 10 are engaged at either end by members 34 extending in opposite directions from the pin support member 30, and it will be noted that the pins are not extended through the support member 30 to the same extent as the pins shown in FIG. 3, and that the cross plates 32 of the two members 34 respectively engage in grooves 18 and 22 while the retainer ring 26 is engaged in groove 20 and disposed in abutting relation to an outside face of the member 30. When employed as shown in FIG. 4 the ends of the pin project substantially equal distances beyond the opposed faces of the member 30. This is furthered by the location of groove 20 at a distance from the outer end of the longer end portion of the pin equal to the length of the shorter end portion of the pin.

The pins 10 may be employed for interconnecting members of various different kinds of assemblies. For example the pins may be inserted through upright support members 30 of a carrel knockdown assembly, to engage in slotted cross plates provided adjacent the ends of one or more stretchers or wireways of a carrel assembly. Such a carrel assembly is shown in copending application Ser. No. 230,001, filed Feb. 28, 1972.

In FIG. 5 the pins are shown for connecting sections of a sectional bookcase comprising pairs of upright supports 40, 42 and 44, 46 which support one or more shelves 48. The shelves of a section may be connected to their end support members in any desired way. The rear support members 40 and 44 of the pairs of upright support members are interconnected by a cross member 50, which may be provided with slotted cross plates 51 adjacent their ends and similar to the cross plates 32 of the members 34. By inserting the pins 10 through the support members 40 and 44 as shown in FIG. 3, a cross member 50 may be interconnected at either end to the upright members 40 and 44 respectively, and by positioning the pins extending through the uprights 40 and 44 as shown in FIG. 4 the uprights 40 and 44 may be connected also the cross member 52 and 54 respectively, thus adding additional sections to a sectional bookcase.

In FIGS. 6, 7 and 8, the use of pins 10 inserted through a support member 60 in crossed relation and extending in the same plane is illustrated. The assembly members 62 and 64 are shown provided with cross plates 65 similar to the cross plates 32 shown in FIGS. 2-4, and these cross plates are shown apertured with keyhole slots 66. In assembling a member 62 or 64 with a member 60 the end of said member 62 or 64 is raised slightly to receive the projecting ends of pins 10 inserted through vertically aligned pairs of holes in the member 60, and members 62 and 64 are then lowered so that the narrower portions of the keyhole slots will engage the ends of the pins respectively and so that the edges of the cross plates defining the narrower ends of the slots will engage in the desired peripheral groove of the pins.

In FIG. 7 it is shown that when pins are crossed at the same level they will be inserted through the member 30, 50 or 60 as the case may be to a different extent. This is to facilitate the insertion of one pin through a support member such as 60 at the same level as a similar pin previously inserted through the support member but at a rotary angle of 90°.

In FIG. 8 a pin 10 is shown being inserted through one of an aligned pair of holes 68 in a support member 60 in crossed relation to a similar pin 10 which has already been inserted through member 60 through a pair of holes disposed at right angles to the holes 68. While the overall length of the pins involved may vary according to the diameter of the support member 60 through which the pins are inserted, FIG. 8 illustrates why the reduced portion 12 of the pin is long relative to the length of the pin and extends nearer to one end of the pin than to its other end. This is done so that the second of a pair of pins may be inserted through the first of its pair of aligned holes through the support member with its end 14 as the leading end, and may be tilted while being advanced through the support member until the shorter end 14 of full diameter has passed over a previously inserted cross pin, and so that there will be room within the tubular support member for the leading end of the pin to be returned to a horizontal position within the tubular member and passed through the second of the aligned pair of holes, and then further advanced through the support member until its leading end is inserted through the slot 66 in the cross plate of the opposed assembly member 32 sufficiently for the slot defining edge of the cross member to be dropped into groove 18.

It will be understood that a pin 10 having a cross section other than round may be employed, such for example as a pin which is square in cross section, and that the intermediate portion 12 may be other than half round, such for example as rectangular, with one cross sectional dimension reduced to not more than one half another cross sectional diameter disposed at a right angle to it.

I claim:

1. A pin adapted to be inserted through a tubular support member of an assembly to connect the member with one or two other parts of the assembly said pin comprising a half round portion of reduced diameter disposed between two end portions which are round in cross section, one of said end portions being shorter than the other and defining one circumferential groove and the other of said end portions defining two axially spaced circumferential grooves, the pin being long enough so that when inserted through said member its grooved ends project beyond opposite faces of the member respectively and a retaining ring selectively seated in any of the said grooves, the portion of reduced diameter being so disposed between the end portions that two of the pins may be inserted through the support member at the same level and disposed in angularly related position in the same plane with the ends of each pin projecting from opposite sides of the support member.

2. The interconnecting pin claimed in claim 1 in which the portion of reduced diameter and the inner of the two grooves defined by the longer end portion of the pin are so disposed that the distance between the inner of said grooves and the outer end of the longer end portion of the pin is substantially equal to the length of the shorter end portion of the pin.

* * * * *